United States Patent
Wu et al.

(10) Patent No.: US 10,547,132 B2
(45) Date of Patent: Jan. 28, 2020

(54) CHIP MODULE FOR TONER CARTRIDGE

(71) Applicants: GENERAL PLASTIC INDUSTRIAL CO., LTD., Taichung (TW); KATUN CORPORATION, Minneapolis, MN (US)

(72) Inventors: Yi-Chia Wu, Taichung (TW); Joseph A. Amberg, Minneapolis, MN (US); Terry Erickson, Minneapolis, MN (US)

(73) Assignees: GENERAL PLASTIC INDUSTRIAL CO., LTD., Taichung (TW); KATUN CORPORATION, Minneapolis, MN (US)

( * ) Notice: Subject to any disclaimer, the term of this patent is extended or adjusted under 35 U.S.C. 154(b) by 0 days.

(21) Appl. No.: 16/051,930

(22) Filed: Aug. 1, 2018

(65) Prior Publication Data

US 2019/0296468 A1   Sep. 26, 2019

(30) Foreign Application Priority Data

Mar. 23, 2018   (TW) .............................. 107110004 A

(51) Int. Cl.

| H01R 12/00 | (2006.01) |
|---|---|
| H01R 12/71 | (2011.01) |
| G03G 15/08 | (2006.01) |
| H01R 12/58 | (2011.01) |
| H01R 13/516 | (2006.01) |
| H01R 13/648 | (2006.01) |
| G06K 19/077 | (2006.01) |
| G03G 21/18 | (2006.01) |

(52) U.S. Cl.
CPC ....... *H01R 12/716* (2013.01); *G03G 15/0863* (2013.01); *G03G 21/1871* (2013.01); *G06K 19/077* (2013.01); *H01R 12/585* (2013.01); *H01R 13/516* (2013.01); *H01R 13/648* (2013.01); *G03G 15/0872* (2013.01)

(58) Field of Classification Search
CPC .. H01R 13/6658; H01R 13/514; H01R 33/22; H01R 13/518; H01R 13/506
USPC ............... 439/76.1, 701, 707, 713, 351, 529
See application file for complete search history.

(56) References Cited

U.S. PATENT DOCUMENTS

| 6,773,270 B2 * | 8/2004 | Ushio | ................ H01R 13/6273 439/76.1 |
| 7,860,427 B2 * | 12/2010 | Hayashi | ............. G03G 21/1652 399/262 |

* cited by examiner

*Primary Examiner* — Phuong Chi Thi Nguyen
(74) *Attorney, Agent, or Firm* — Muncy, Geissler, Olds & Lowe, P.C.

(57) ABSTRACT

A chip module for a toner cartridge includes a substrate having a top surface, a memory disposed on the substrate, transmission terminals electrically connected with the memory, and a ground terminal. Each transmission terminal has two legs disposed on the substrate, and a bridge connected between the two legs and located at a distance above the top surface of the substrate. The ground terminal is disposed on the substrate and located between the transmission terminals. The ground terminal is a lamellar-shaped piece and nonparallel to the top surface of the substrate. The chip module is firmly mounted to the toner cartridge and positively aligned and contacted with a reading head of an electronic image-forming apparatus.

17 Claims, 9 Drawing Sheets

CHIP MODULE FOR TONER CARTRIDGE

BACKGROUND OF THE INVENTION

1. Field of the Invention

The present invention relates generally to an electronic image-forming apparatus and more particularly, to a chip module for a toner cartridge for an image-forming apparatus.

2. Description of the Related Art

A conventional electronic image-forming apparatus, such as photocopier or printer, is generally equipped with a replaceable toner cartridge therein. The toner cartridge is provided at a front end portion thereof with a chip adapted to be contacted with a reading head of the electronic image-forming apparatus for data communication. The reading head has a base, a plurality of communication terminals and a ground terminal. To positively align and position the chip of the toner cartridge with the reading head, the base is disposed with a pillar, on a lateral side of which the ground terminal is provided, and the chip is provided with an aligning and positioning structure corresponding to the pillar. Toner cartridges are consumables. After the toner contained in a toner cartridge is completely charged out, the old toner cartridge needs to be replaced by a new one. Therefore, designing a chip structure to ensure that a newly inserted toner cartridge can be positively in alignment and contact with the reading head of the electronic image-forming apparatus is always a challenge to the manufacturers in this industry field.

SUMMARY OF THE INVENTION

The present invention has been accomplished in view of the above-noted circumstances. It is an objective of the present invention to provide a chip module for a toner cartridge, which can be firmly disposed on the toner cartridge and can be positively in alignment and contact with the reading head of the electronic image-forming apparatus.

To attain the above objective, the present invention provides a chip module for a toner cartridge, which comprises a substrate having a top surface, a memory disposed on the substrate, a plurality of transmission terminals electrically connected with the memory, and a ground terminal. Each transmission terminal has two legs disposed on the substrate, and a bridge connected between the two legs in a way that the bridge is located at a distance above the top surface of the substrate. The ground terminal is disposed on the substrate and located between the transmission terminals. The ground terminal is a lamellar-shaped piece and arranged nonparallel to the top surface of the substrate. As a result, the chip module can be firmly disposed on the toner cartridge and positively in alignment and contact with the reading head of the electronic image-forming apparatus.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
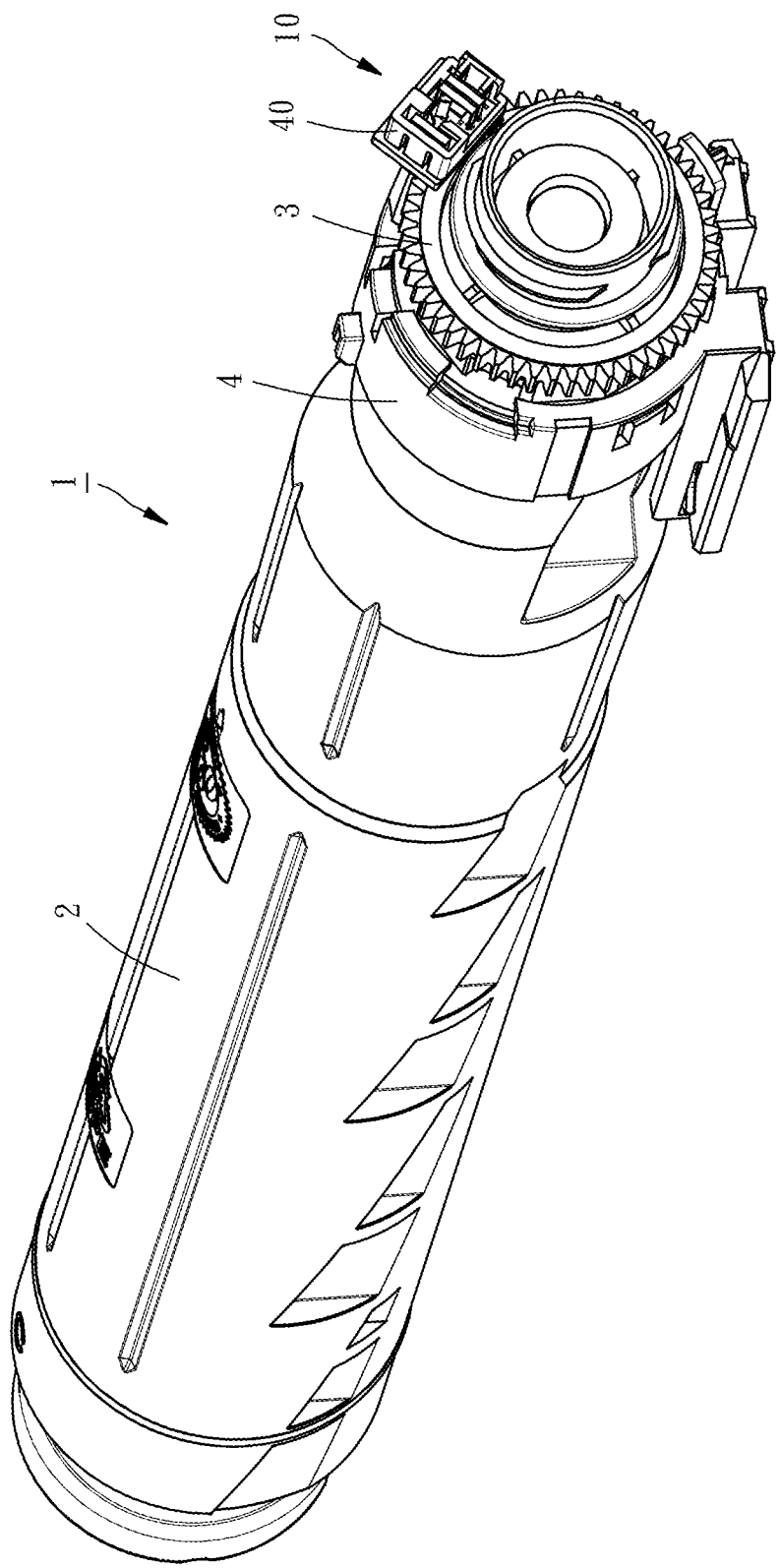
FIG. 1 is a perspective view, showing that chip module in accordance with an embodiment of the present invention is disposed on the toner cartridge.
Figure 2:
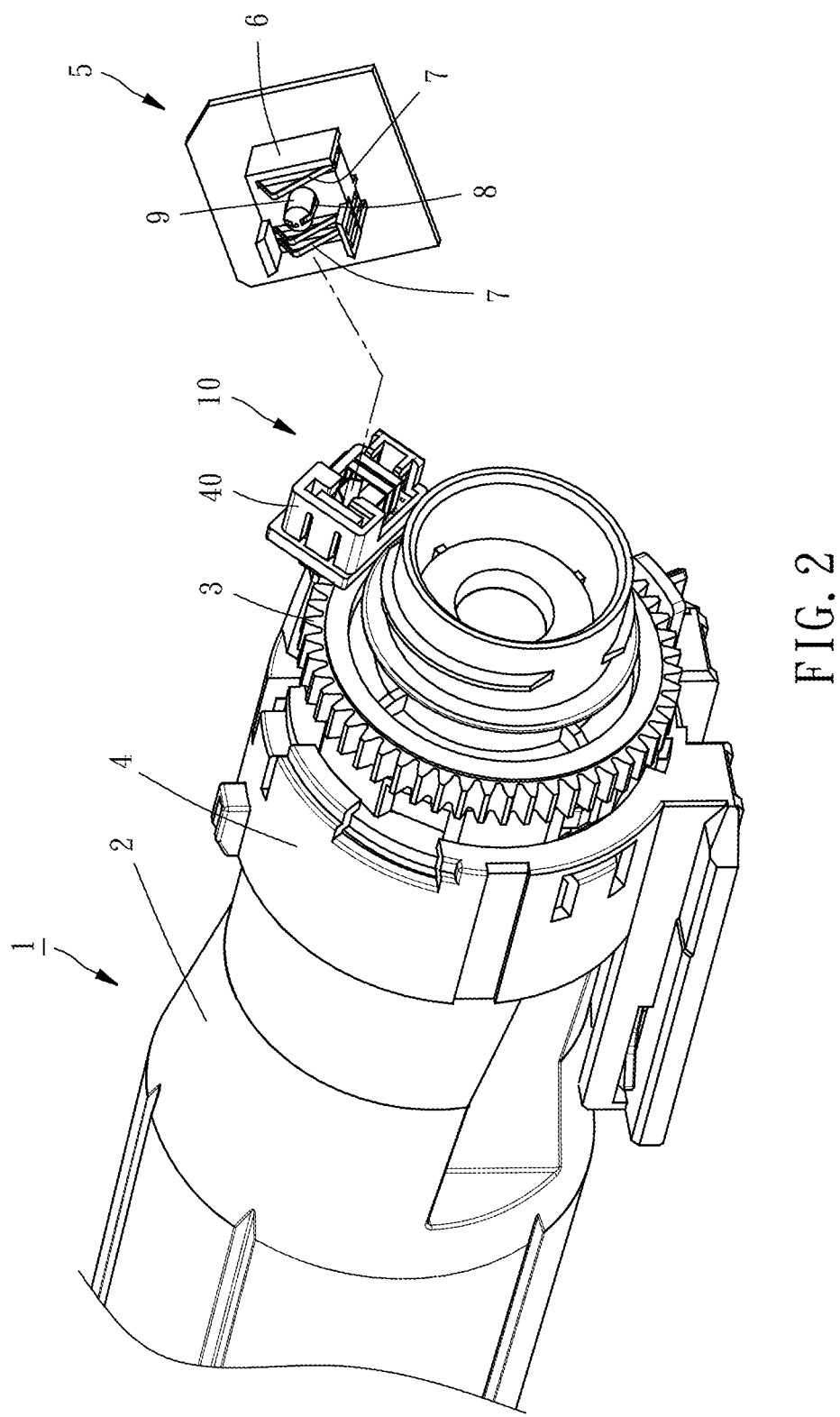
FIG. 2 is a perspective view, showing a part of the toner cartridge carrying the chip module of the embodiment of the present invention and a reading head of an electronic image-forming apparatus; the chip module of the embodiment of the present invention.

Hereunder an embodiment will be detailedly described with accompanying drawings for illustrating technical features and structure of the present invention. As shown in FIGS. 1 and 2, a chip module 10 provided in accordance with the first embodiment of the present invention is used to be disposed at a front end portion of a toner cartridge 1. When the toner cartridge 1 is installed into an electronic image-forming apparatus (not shown), the chip module 10 is mechanically engaged and electrically connected with a reading head 5 of the electronic image-forming apparatus for enabling signal transmission between the toner cartridge 1 and the electronic image-forming apparatus. The toner cartridge 1 is composed of a barrel 2, an annular tooth portion 3 around a front section of the barrel 2, and a sleeve mount 4 sleeved onto the barrel 2. The annular tooth portion 3 is engaged with a driving gear (not shown) of the electronic image-forming apparatus, such that the barrel 2 is driven by the driving gear to rotate via the annular tooth portion 3. The sleeve mount 4 is fixedly engaged in the electronic image-forming apparatus without being rotated with the barrel 2. The reading head 5 is composed of a base 6, three communication terminals 7 and a ground terminal 8. The base 6 has a pillar 9 located between the three transmission terminals 7, and the ground terminal S is provided at a lateral side of the pillar 9. The chip module 10 is composed of a substrate 12, a memory 18, three transmission terminals 20, a ground terminal 30 and a connection mount 40.

Figure 3:
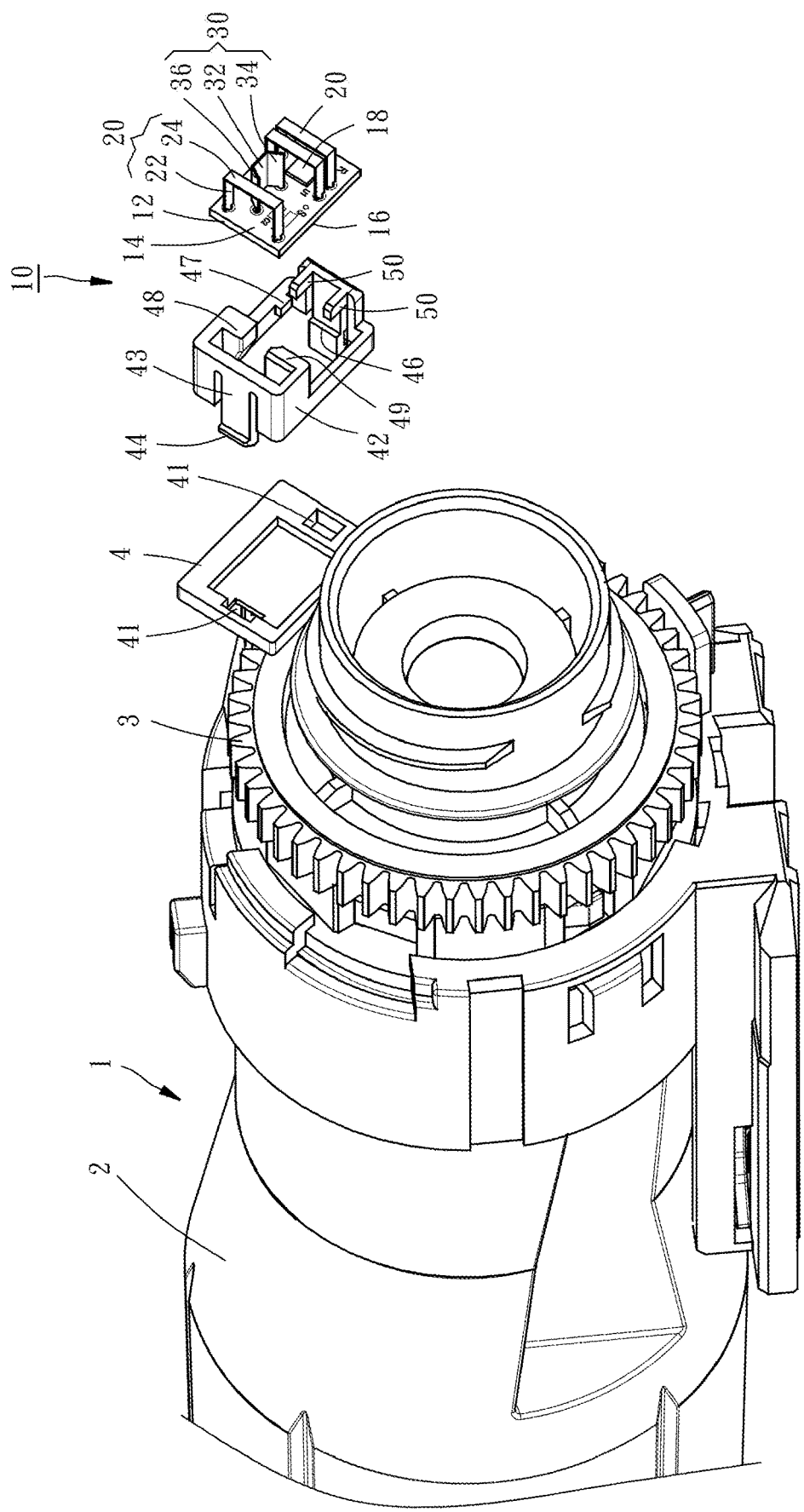
Figure 4:
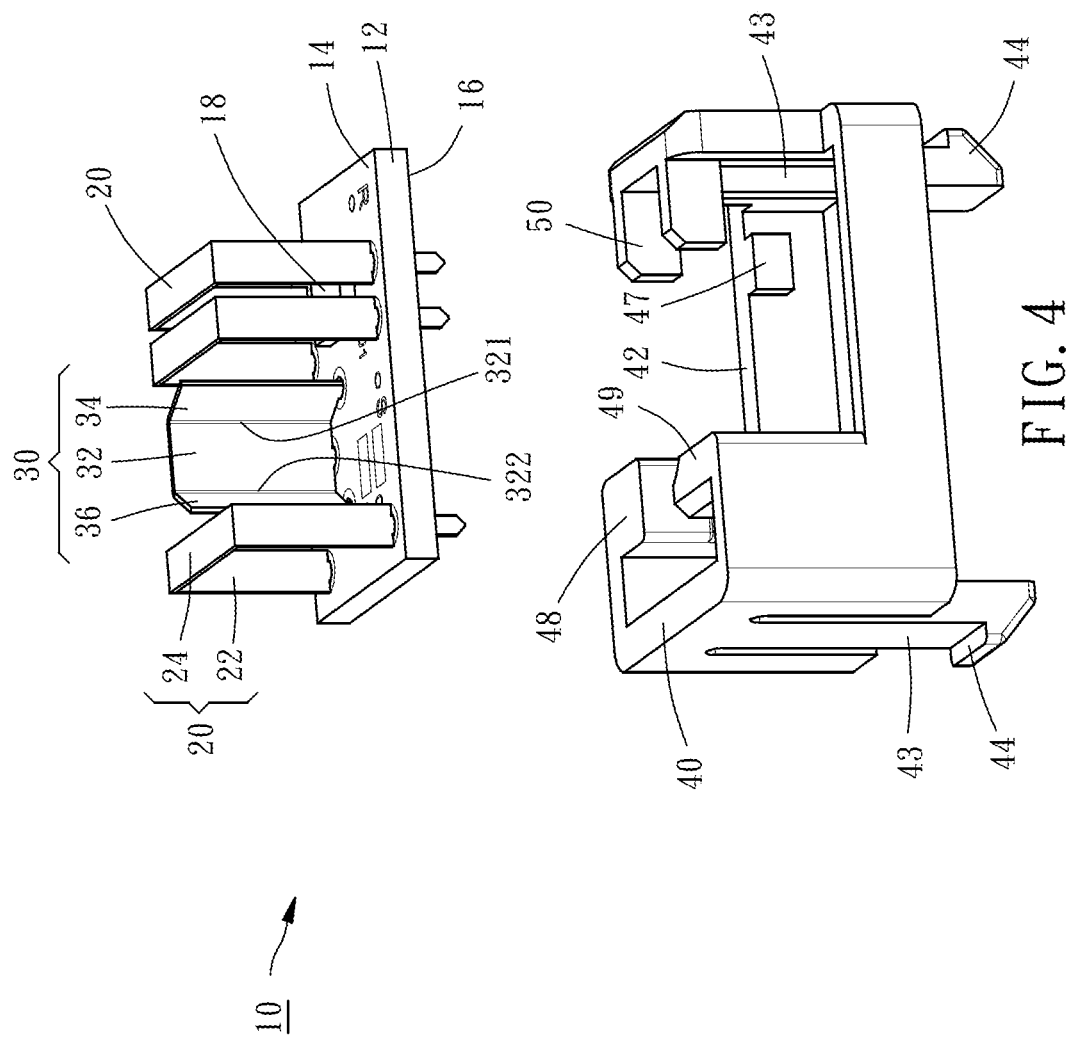
FIG. 4 is an exploded view of the chip module in accordance with the embodiment of the present invention.

As shown in FIGS. 3 and 4, the substrate 12 is a printed circuit board having a top surface 14 and a bottom surface 16. The memory 18 is disposed on the top surface 14 of the substrate 12. In other embodiment, the memory 18 may be disposed on the bottom surface 16 of the substrate 12.

The transmission terminals 20 are electrically connected with the memory 18. Each transmission terminal 20 includes two legs 22 perpendicularly disposed on the top surface 14 of the substrate 12, and a bridge 24 connected between top ends of the two legs 22 in a way that the bridge 24 is located at a distance above and parallel to the top surface 14 of the substrate 12. The transmission terminals 20 are arranged corresponding in position to the communication terminals 7 of the reading head 5.

The ground terminal 30 is disposed on the substrate 12 and located between the transmission terminals 20. The ground terminal 30 is a lamellar-shaped piece and arranged nonparallel to the top surface 14 of the substrate 12. In this embodiment, the ground terminal 30 is perpendicular to the top surface 14 of the substrate 12 and has a curved shape or a bent shape. In this embodiment, the ground terminal 30 is composed of a flat main body 32, a first flat wing portion 34 disposed at a first side 321 of the main body 32, and a second flat wing portion 36 disposed at a second side 322 of the main body 32. The second side 322 of the main body 32 is opposite to and remote from the first side 321 of the main body 32. A first included angle is formed between the first flat wing, portion 34 and the main body 32 and a second included angle is formed between the second flat wing portion 36 and the main body 32, such that the ground terminal 30 is configured like a screen having two wings. The ground terminal 30 is arranged corresponding in position to the pillar 9 carrying the ground terminal S of the reading head 5 and extending around the lateral side of the pillar 9.

Figure 5:
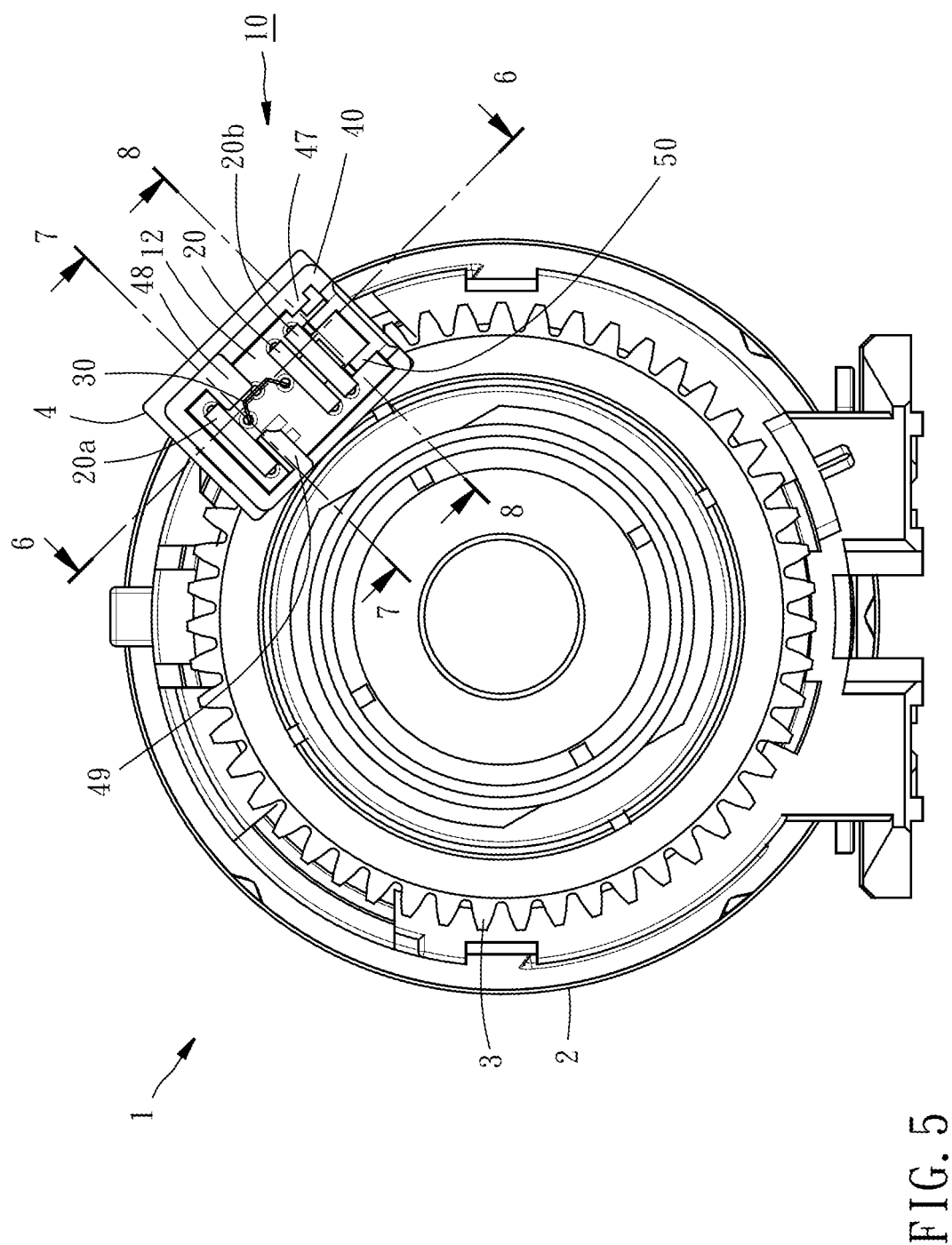
FIG. 5 is a right side view of the toner cartridge in accordance with the embodiment of the present invention.
Figure 6:
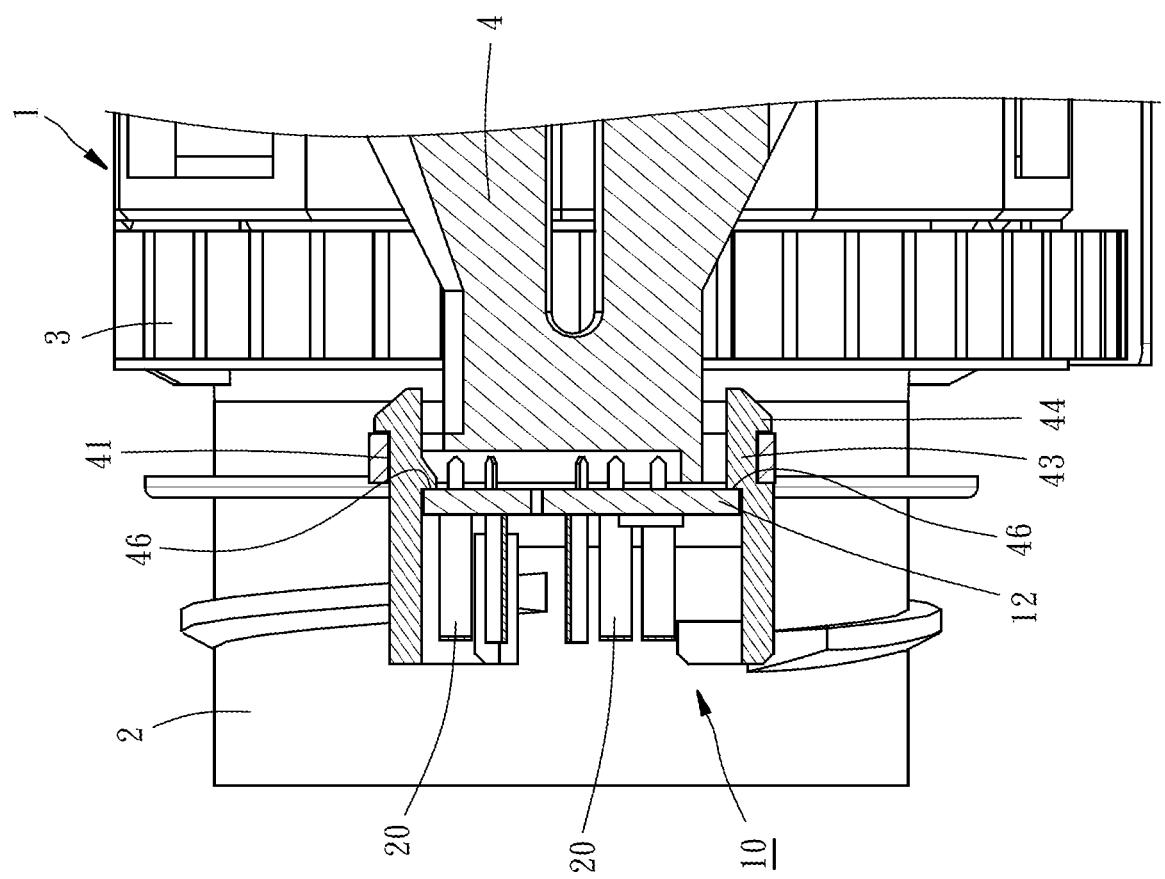
FIG. 6 is a sectional view taken along line 6-6 of FIG. 5.
Figure 7:
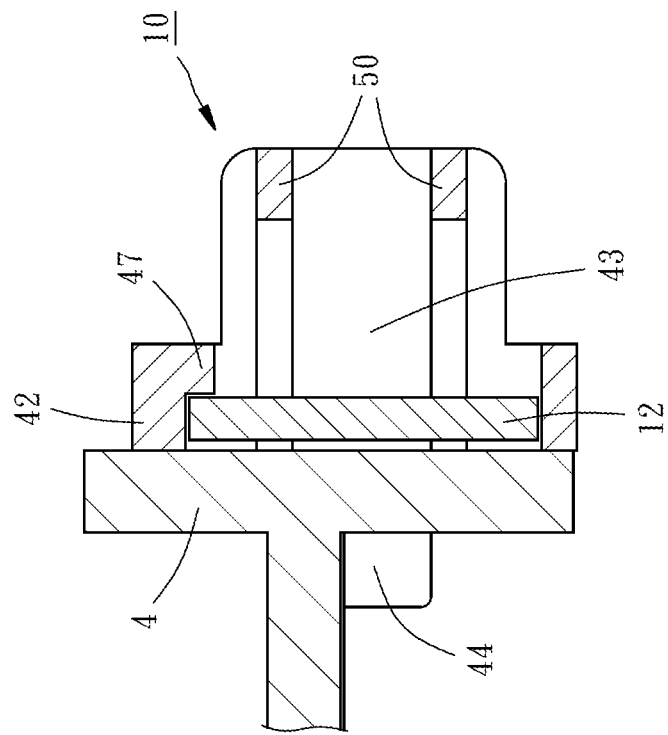
FIG. 7 is a sectional view taken along line 7-7 of FIG. 5.
Figure 8:
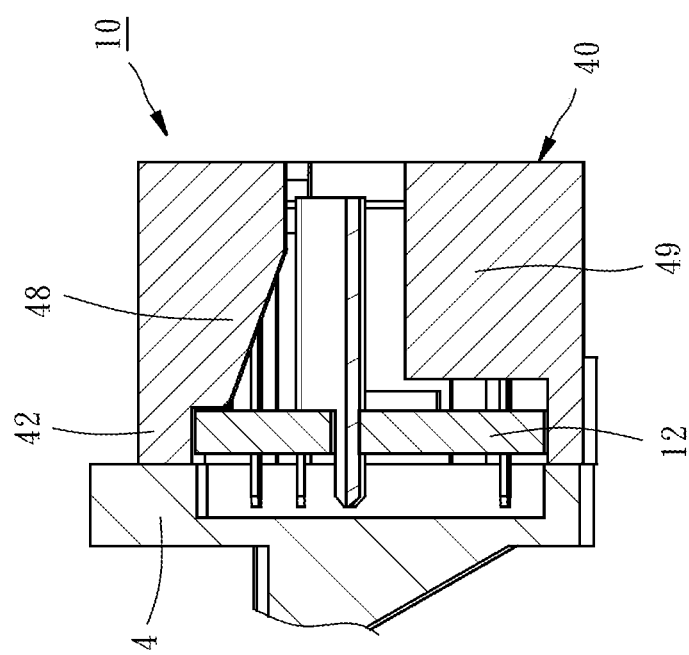
FIG. 8 is a sectional view taken along line 8-8 of FIG. 5.
Figure 10:
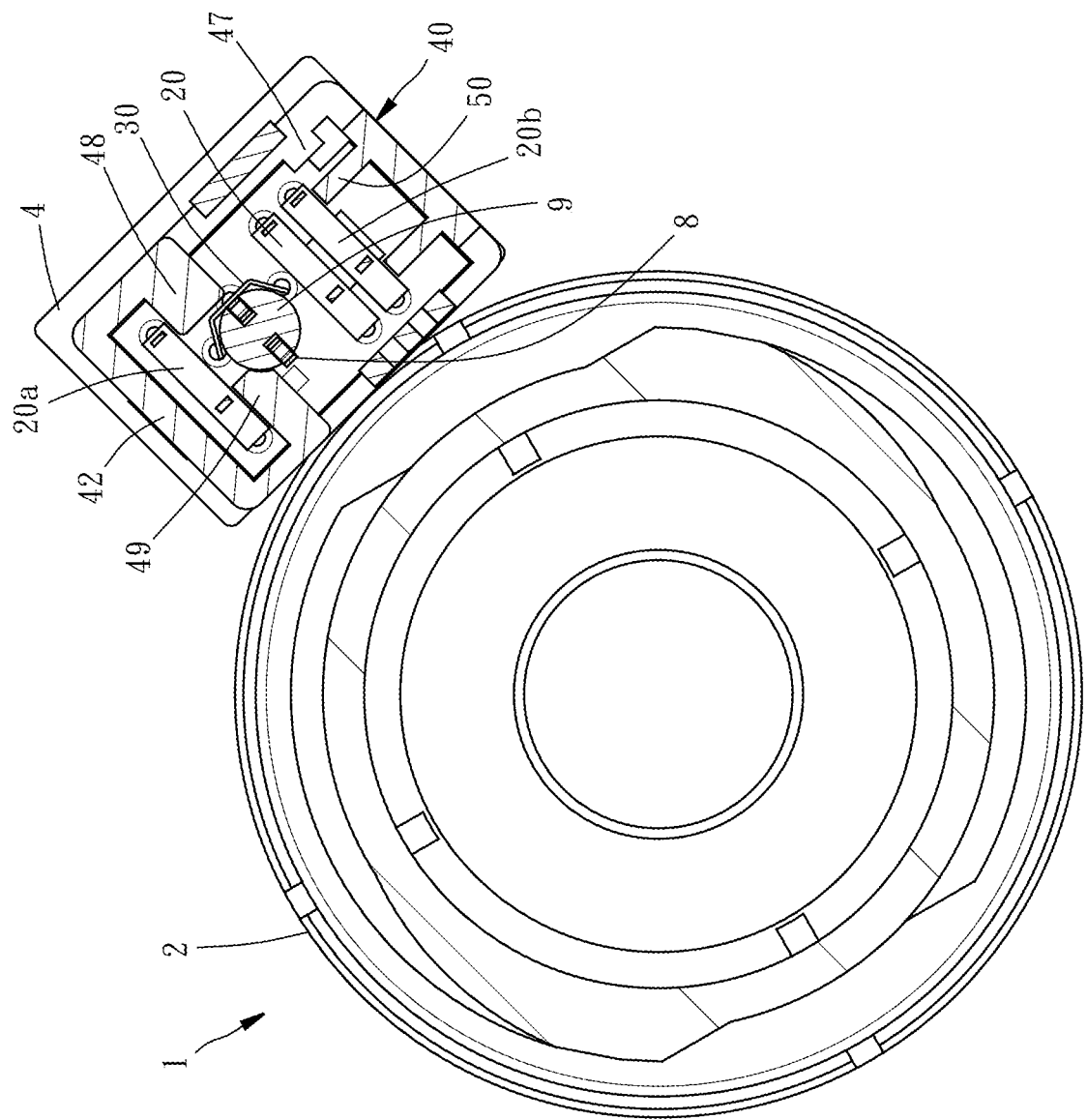
FIG. 10 is a sectional view taken along line 10-10 of FIG. 9.

The connection mount 40 is used to connect the substrate 12 with the sleeve mount 4 of the toner cartridge 1. The connection mount 40 includes a rectangular periphery wall 42 surrounding the substrate 12, and two elastic arms 43 extending outwardly from two opposite sides of the periphery wall 42, respectively. As shown in FIGS. 5 and 6, the two elastic arms 43 are used to be inserted into two insertion holes 41 of the sleeve mount 4 of the toner cartridge 1, respectively. Each elastic alias 43 is provided at a terminal end thereof with a hook 44 hooked on the sleeve mount 4, such that the connection mount 40 is firmly connected with the sleeve mount 4. Further, each elastic arm 43 is provided at an inner side thereof with a stepped portion 46 abutted against the bottom surface 16 of the substrate 12. The periphery wall 42 of the connection mount 40 is provided at an inner side thereof with a plurality of ribs for being abutted against the top surface 14 of the substrate 12 so as to restrict the substrate 12 between the stepped portions 46 of the two elastic arms 43 and the ribs. The positions and shapes of the ribs may be modified as long as the ribs can restrict the substrate 12 in a desired position. In this embodiment, the periphery wall 42 is provided at the inner side thereof with a first rib 47, a second rib 48 and a third rib 49. The first rib 47 extends outwardly from a corner of the periphery wall 42. The second rib 48 is located adjacent to the main body 32 of the ground terminal 30 and one of the transmission terminals, i.e. terminal 20a as shown in FIG. 10. The third rib 49 is located adjacent to the terminal 20a and the second side 322 of the main body 32 and the second wing 36 of the ground terminal 30. The first and second ribs 47 and 48 are abutted against the top surface 14 of the substrate 12 so as to clamp the substrate 12 between the stepped portions 46 and the ribs 47, 48 and 49, as shown in FIGS. 7 and 8. Further, the periphery wall 42 of the connection mount 40 is provided at the inner side thereof with two suspension arms 50 located adjacent to another transmission terminal 20b and at a distance above the top surface 14 of the substrate 12, as shown in FIGS. 8 and 10.

Figure 9:
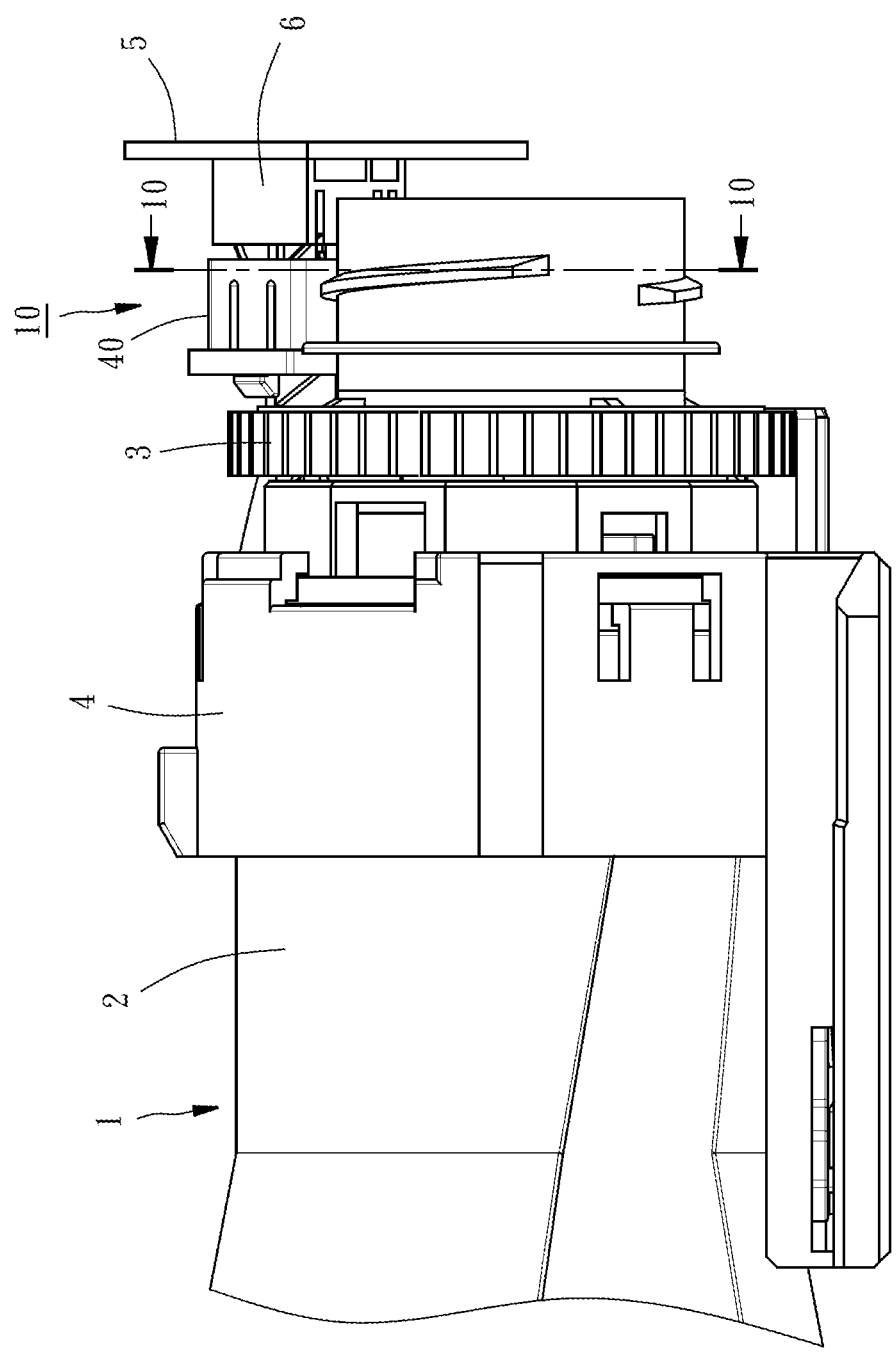
FIG. 9 is a front view, showing that the clip module of the embodiment of the present invention is engaged with the reading head.

When the toner cartridge 1 is inserted into an electronic image-forming apparatus, the chip module 10, which is located at the front end portion of the toner cartridge 1, is contacted with the reading head 5, as shown in FIGS. 9 and 10, in a way that the three communication terminals 7 are in contact with the three transmission terminals 20 respectively, and the pillar 9 is inserted into a space between the third rib 49 and the ground terminal 30. In this way, the chip module 10 is positively aligned and engaged with the reading head 5, and the ground terminal 8 of the reading head 5 can be positively contacted with the ground terminal 30 of the chip module 10, achieving the objectives of the present invention. Further, because the second rib 48 and the third rib 49 are arranged adjacent to the ground terminal 30 and the transmission terminal 20a, the second and third ribs 48 and 49 can provide a support function to prevent inclinations of the ground terminal 30 and the transmission terminal 20a due to an external force exerting thereon. Similarly, because the two suspension arms 50 are arranged adjacent to the transmission terminal 20b, a function of preventing inclination of the transmission terminal 20b is provided.

Based on the above-mentioned technical features, various modifications to the structure of the chip module 10 may be made. For example, the two flat wing portions of the ground terminal 30 may be omitted. The connection mount 40 is used to connect the substrate 12 with the sleeve mount 4 of the toner cartridge. The structure of the connection mount 40 may be modified and not limited to the one disclosed in the previous embodiment. In an alternate embodiment, the substrate 12 may be directly mounted to the sleeve mount 4 or mounted to another member of the toner cartridge 1. The numbers and positions of the ribs and suspension arms of the connection mount 40 may be modified in accordance with actual need. The ribs and suspension arm of the connection mount 40 may be omitted as long as the substrate 12 can be connected with the connection mount 40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chip module for a toner cartridge, comprising:
a substrate having a top surface;
a memory disposed on the substrate;
a plurality of transmission terminals electrically connected with the memory, each of the transmission terminals having two legs disposed on the substrate, and a bridge connected between the two legs in a way that the bridge is located at a distance above the top surface of the substrate; and
a ground terminal disposed on the substrate and located between the transmission terminals, the ground terminal being a lamellar-shaped piece and arranged non-parallel to the top surface of the substrate.

2. The chip module of claim 1, wherein the ground terminal is perpendicular to the top surface of the substrate.

3. The chip module of claim 1, wherein the ground terminal has a curved shape or a bent shape.

4. The chip module of claim 3, wherein the ground terminal comprises a flat main body and a first flat wing portion disposed at a first side of the main body.

5. The chip module of claim 4, wherein the ground terminal comprises a flat second wing portion disposed at a second side of the main body; the second side of the main body is opposite to the first side of the main body.

6. The chip module of claim 4, further comprising a connection mount for connecting the substrate with the toner cartridge.

7. The chip nodule of claim 6, wherein the connection mount comprises a periphery wall surrounding the substrate, and two elastic arms extending respectively from two opposite sides of the periphery wall for being respectively inserted into two insertion holes of the toner cartridge; each of the elastic arms is provided at an inner side thereof with a stepped portion abutted against a bottom surface of the substrate.

8. The chip module of claim 7, wherein the periphery wall of the connection mount is provided at an inner side thereof with a rib, which is located adjacent to one of the transmission terminals and a second side of the main body of the ground terminal; the second side of the main body is opposite to the first side of the main body.

9. The chip module of claim 7, wherein the periphery wall of the connection mount is provided at an inner side thereof with a suspension arm located adjacent to one of the transmission terminals and at a distance above the top surface of the substrate.

10. The chip module of claim 7, wherein the periphery wall of the connection mount is provided at an inner side thereof with at least one rib abutted against the top surface of the substrate so as to restrict the substrate between the stepped portions of the elastic arms and the at least one rib.

11. The chip module of claim 10, wherein the at least one rib comprising a rib that is located adjacent to the ground terminal and one of the transmission terminals.

12. The chip module of claim 1, further comprising a connection mount for connecting the substrate with the toner cartridge.

13. The chip module of claim 12, wherein the connection mount comprises a periphery wall surrounding the substrate, and two elastic arms extending respectively from two opposite sides of the periphery wall for being respectively inserted into two insertion holes of the toner cartridge; each of the elastic arms is provided at an inner side thereof with a stepped portion abutted against a bottom surface of the substrate.

14. The chip module of claim 13, wherein the periphery wall of the connection mount is provided at an inner side thereof with a rib, which is located adjacent to one of the transmission terminals.

15. The chip module of claim 13, wherein the periphery wall of the connection mount is provided at an inner side thereof with a suspension arm located adjacent to one of the transmission terminals and at a distance above the top surface of the substrate.

16. The chip module of claim 13, wherein the periphery wall of the connection mount is provided at an inner side thereof with at least one rib abutted against the top surface of the substrate so as to restrict the substrate between the stepped portions of the elastic arms and the at least one rib.

17. The chip module of claim 16, wherein the at least one rib comprising a rib that is located adjacent to the ground terminal and one of the transmission terminals.

\* \* \* \* \*